United States Patent [19]
Van Manen

[11] 3,752,615
[45] Aug. 14, 1973

[54] INJECTION MOLD/INJECTION BLOW MOLD SYSTEM

[76] Inventor: Dick T. Van Manen, 25 Holiday Harbour, Canandaigua, N.Y. 14424

[22] Filed: June 15, 1971

[21] Appl. No.: 153,262

[52] U.S. Cl............... 425/130, 425/242, 425/249, 425/DIG. 209
[51] Int. Cl............................................. B29d 23/03
[58] Field of Search.................... 425/242, 245, 247, 425/249, 250, 251, 326 B, 387 B, DIG. 203, DIG. 205, DIG. 209, DIG. 211; 264/97, 328

[56] References Cited
UNITED STATES PATENTS

| | | | |
|---|---|---|---|
| 3,302,244 | 2/1967 | Ludwig | 425/249 X |
| 2,656,568 | 10/1953 | Watkins et al. | 425/242 X |
| 3,584,337 | 6/1971 | Aoki | 425/326 X |
| 3,616,491 | 11/1971 | Vollers | 425/387 X |
| 3,632,267 | 1/1972 | Kader | 425/326 |

Primary Examiner—J. Spencer Overholser
Assistant Examiner—Michael O. Sutton
Attorney—John F. McClellan, Sr.

[57] ABSTRACT

An injection mold/injection blow mold having a rotary manifold fed axially from either one, or optionally, two, axially movable injectors located at the respective ends of the manifold, through rotary, axial-slip joints, and having one or more clamps which reciprocate at an angle to the axis of the manifold to co-act in forming molded products of material dispensed through the manifold; sets of mold cavities in the manifold and corresponding sets of cores on each clamp are provided, and both one-direction-rotating and oscillating manifold motion are disclosed, the whole making possible simultaneous two-color and combined-color molding in low-radius, high speed manifold operation.

10 Claims, 4 Drawing Figures

Patented Aug. 14, 1973

INVENTOR
DICK T. VAN MANEN
BY
John F. McClelland Jr.
ATTORNEY

Patented Aug. 14, 1973

INVENTOR
DICK T. VAN MANEN
BY
John F. McClellan Sr.
ATTORNEY

INJECTION MOLD/INJECTION BLOW MOLD SYSTEM

This invention relates generally to mold apparatus and specifically to molds of the type used for injection molding and injection blow-molding of thermoplastics.

In the prior art, various injection molding devices have been provided, some of which were specifically designed for injection blow molding.

However, injection blow molding has historically been a very difficult art, and continuing into the present time has presented the industry with numerous difficulties which prevent full exploitation of the enormous competitive advantages latent in the injection blow molding process.

Among the historic disadvantages of injection blow molding have been overlong cycle time, caused in part by the need to avoid high inertial loads on hot plastic, which can cause wall-variation through unwanted flow and caused also in part by cycle interruption during product discharge; high cost of tooling, caused in part by adaptation of designs originally developed for injection molding; and uneven deformation of the parison on injection which becomes exaggerated in the blowing step into unacceptable wall-thickness variation, caused by imprecise relative positioning of core and injection mold, by insufficient thermal control, by premature movement resulting from elasticity in the apparatus, by slow or uneven injection, by inertial flow during parison transport, or by a combination of these and other factors.

It is a general object of this invention to overcome all these deficiencies through provision of an inventive injection blow molding system never before disclosed.

Further objects of the invention are to provide an injection blow molding system which is adapted for very high production at minimum fixed-installation cost and minimum unit cost; to provide a system as described which is extremely compact and simple, yet which is, through provision of symmetrical load-balancing, more rigid and precise than previously known systems for the purpose;

to provide a system as described which employs a minimum of moving parts, and in which all parts are readily accessible for inspection, adjustment, changeover, repair, and replacement;

to provide a system described which is adapted for injection blow molding or for injection molding parts of a single material, and for simultaneously injection blow molding or for injection molding separate parts of two different materials, as for example, plastic containers of different colors and for injection blow molding or for injection molding of parts having external undercut configuration, but without prolongation of cycles as with use of conventional cam-action molds, and which is adapted for injection blow molding or for injection molding techniques of insert molding, without cycle interruption for loading or discharging finished products.

In brief summary, this invention is characterized by injection of plastic material through one or two reciprocable members into the axis of a small diameter rotative member which in turn co-acts with one or more members which reciprocate at an angle to the axis of the rotative member in injection molding and injection blow molding operations; simultaneous movement of material injected in opposing directions, and optionally separable or comminglable plural feed are also characteristics.

The above and the other advantages and objects of this invention will become more readily understood from the following description, including the drawings, in which.

In the Figures, like numerals designate like parts.

Taking up the figures in detail.

Figure 1:
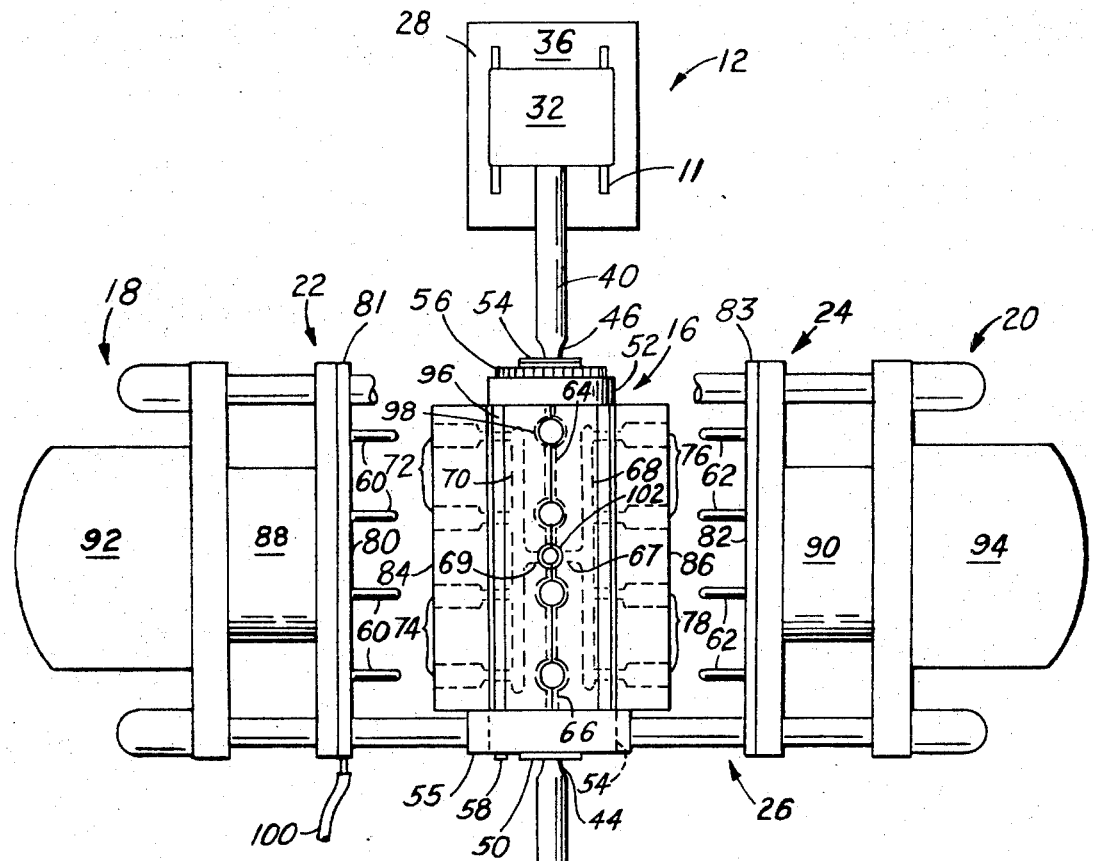
FIG. 1 is a plan diagram of an embodiment of the invention showing injectors, manifold, and clamps.

FIG. 1 diagrams an embodiment 10 of this invention, comprising the following principal sub-assemblies:

(a) injection units 12, 14, which axially feed (b) four-sided manifold 16; and (c) clamp assemblies 18, 20, which are adapted to reciprocate (d) respective platen assemblies 22, 24, to and from the manifold at an angle to the axis of the manifold, preferably along radii of the manifold, in a path defined by (e) a tie bar assembly 26. The tie-bar assembly preferably includes four tie-bars, two being in over-and-under relation on each side of FIG. 1, so that only two appear, the upper two in the drawing being shown broken away for exposition.

Both injection units are similar, or they may be identical, and likewise, both clamp assemblies are similar, or may be identical.

The injection units consist of mounting bases 28, 30 which align and secure in place injectors 32, 34, which are powered respectively by motors 36, 38. Each injector includes a barrel 40, 42, and each barrel terminates in a nozzle 44, 46. Each injector assembly is mounted on ways 11, 13 for reasons which will appear later (in reference to FIG. 3).

The nozzles feed plastic through the center of sleeves 48, 50 which are axially disposed on the ends of the manifold as integral parts of the manifold. The sleeves also serve as axles, rotatively mounting the manifold in bearings 52, 54. The two bearings are positioned in bearing blocks, bearing block 55 being shown. The bearing blocks are respectively clamped to two tie-bars at each end of the manifold.

A gear drive, not shown, is used to rotate the manifold by means of gear 56 mounted to the end of bearing block 52.

A gear tooth stop 58 or other locator is provided on bearing block 54 at the other end of the manifold to co-act with a pawl, not shown, and stop rotation of the manifold precisely at the predetermined positions necessary for co-action with the sets of cores 60, 62 carried as part of platen assemblies 22, 24 respectively. The platen assemblies slidably journal the tie bars, which are used as ways for the platens.

The co-action takes place as follows, in the injection molding stage for which the parts are aligned in FIG. 1:

Material injected from the nozzles 44, 46 of the injection units passes through axial sprues 64, 66 and through sets of lateral sprues 68, 70, connected by radial channels 67, 69, into sets of injection mold cavities 72, 74, 76, 78, designed to mate with the cores. When the clamp units 18, 20 hydraulically or otherwise advance the platen-carried cores along the tie bars and co-axially into the injection molds, the flat surfaces 80, 82 on the mold bases 81, 83, which mount the cores, seal flat against surfaces 84, 86 respectively, of the manifold. Molten plastic is then preferably simultaneously injected axially into both ends of the manifold, causing flow through the sprues and simultaneous injection of parisons, in radially opposite directions, over the oppositely pointing sets of cores in the injection molds. Following this, the clamps then simultaneously retract the cores with the parisons aboard.

Lines such as designated by 100 are provided to supply the mold bases with fluid, according to conventional practice.

From the above it will be apparent that the structure has been diagrammatically simplified for purposes of exposition. For example, for making threaded necks, split, movable neck rings would be affixed to the mold bases, according to conventional practice.

Also, instead of the gear drive shown, a fixed-stop index mechanism would usually be employed in the simplest embodiment, where an oscillating cycle-motion instead of a continual rotation permits. This structure is especially favored by the low-radius nature of the manifold, which has relatively low rotational momentum even in high speed operation. Spaced stops are fixed to the injector base or other structure, and a third stop (on the manifold) is arranged to travel between them, defining the limits of rotation; the inverse arrangement can also be used.

At this point several very important aspects of the invention should be noted.

All forces acting on the manifold are balanced during the injection. This leaves, theoretically, zero net thrust on the mountings of the manifold, and despite the tons of force instantaneously applied on it by the injection process, the manifold perfectly maintains the critical positioning necessary with respect to the cores to prevent wall distortion in the product.

Because the forces acting on the manifold are balanced, the manifold structure itself, including the manifold mountings, can be of relatively economical construction, compact and accessible, and the manifold is made to have low rotational inertia, making high speed indexing easy, precise, and secure.

Additionally, another advantage of this structure should be noted. Any vibration resulting from high-speed reciprocation of the clamp assemblies is self-damping, since the acceleration forces for the driven portions, pistons 88, 90, and the respective platen assemblies 22, 24 are equal and opposite. This aids smooth injection, free from flutter of the cantilevered cores. This feature is particularly important when small diameter, relatively long cores must be used.

Also, as to the structure, since the reaction loads imposed on the four tie-bars of tie-bar assembly 26 by the opposed clamp cylinders 92, 94 affixed to the ends of the tie bars, are axial, equal and opposite, and since bending loads which would otherwise be imposed on the sides of the tie-bars by action of the injection units are oppositely nulled out through the manifold, the tie bar assembly itself can be lightweight, compact, and economical.

In contrast with prior art devices, flexible cores are not required in the structure of this invention; the precise alignment afforded allows rigid cores to be used, considerably simplifying and improving core design.

Also, it should be noted that the provisions for cavity movement allow the use of only one set of cores, except for pressure balancing considerations.

And finally, inertial loads on the hot parisons carried from the molds on the cores are axially symmetrical, so that all sidewalls of the parisons are equally affected and no wall is distorted assymetrically.

The same advantages described above in reference to the injection molding process and apparatus carry over into the injection blow molding process and apparatus, as follows.

The four cavity-bearing sides of the manifold are screw-attached to the manifold, permitting quick exchange for other units.

Two of the four sides of the manifold have been described as having sets of injection molding cavities in them.

The other two sides, the one away from the viewer in FIG. 1 and side 96 which appears in plan view in FIG. 1, are supplied with sets of blow molding cavities 98. The blow mold cavity bearing sides are longitudinally split, as indicated, to permit ejection of parts by opening-movement of one or both sides in accordance with well known practice in the art.

After injection molding, and in preparation for rotation of the manifold to the injection blow molding position, the apparatus appears as in FIG. 1, except that the cores are covered by parisons. In the next process step, the manifold is immediately rotated 90° from the position shown to the position in which the injection blow mold cavities 98 are aligned with the cores.

The cores are then inserted by action of the clamps into the injection blow molds, with the proximate surfaces of the platens, and manifold sealing as before, and compressed fluid, usually air, is applied through channels in the cores according to usual practice, expanding the parisons in the blow mold cavities.

Another unique and extremely useful provision for the manifold of this invention is shown diagrammatically at 102. This is a valve for connecting together all the sprues, or for isolating them into symmetrical halves about the valve position half-way along the length of the manifold.

This provision allows simultaneous injection from each end of the manifold of the same material commingled or separately routed, or of two different materials commingled or separately routed. Thus, striated or other unusual color or composition effects are made possible, as well as simultaneous runs of separately colored products.

The venting of pressure between the two injectors makes it impossible to have any substantial axial force imbalance, even though commencement or ending of injection, or duration of injection, is not the same for both injectors.

Figure 2:
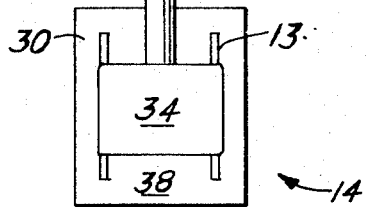
FIG. 2 is an end elevation detail of a manifold like that shown in FIG. 1, disposed for co-action with cores in the injection molding stage.

FIG. 2 is an end elevation detail of a manifold 216 similar to that of FIG. 1, having injection molding cavities 272, 276 disposed for co-action with cores 260, 262 respectively. Two sets of split injection blow molding cavities 298, 299 are also supplied in respective 90° relation with the injection molding cavities; retained and guided by a slot 231 and lug 233 or other way system, these conventionally open to eject the product as indicated by the arrows. There is no interference with ejection and no increase in cycle time is required.

The bearing 254 supports the end of the manifold through journalled relation with a bearing block as previously described. The bearing block bottom half, which is shown as 255a, is clamped to a tie bar 226a below the bearing block. The top half of the bearing block is not shown but is similarly clamped to the tie bar above it.

Gear 256 which supplied means for rotating the manifold and/or for indexing the rotative position, is screwed to the face of the bearing block.

A portion of an injection barrel 242 is shown in section, positioned within sleeve 250, ready for injection of material into the manifold through nozzle 246. The relation of the sleeve and nozzle illustrates another important aspect of this invention, provision for axial withdrawing motion of all or a portion of the injector after injection, to relieve pressure in the system. Ways 11, 13, FIG. 1 allow the injectors to be withdrawn under power.

Figure 3:
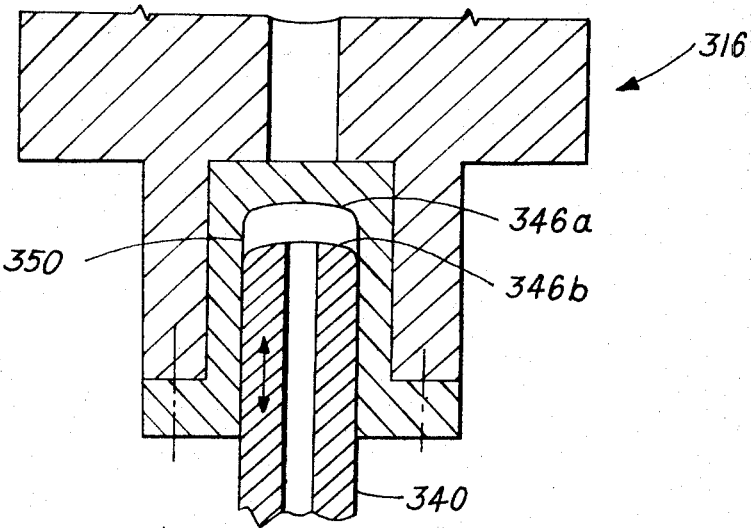
FIG. 3 is a plan detail in section of an injection nozzle-to-manifold relation.

FIG. 3 further discloses such provision, as a plan detail in section of manifold 316, with the bearing removed.

The injector barrel 340 snugly fits manifold sleeve 350. Both the female portion 346a and the male portion 346b of the nozzle assembly are radiused, but the radii are unequal, the male radius being shorter. This arrangement is well suited for the rotating manifold configuration of this invention and forms a pressure-tight ring-seal when the parts are forced together for injection. However, other conventional arrangements can be used also if compatible with the following. After injection, to prevent unwanted creeping of the plastic mass such as can result from residual pressures, the barrels of the injectors are withdrawn axially a distance sufficient to reduce pressure and negate any creeping of the plastic in the manifold. The double pointed arrow indicates this motion. As can be seen, the arrangement is well suited for use in cooperation with compression nozzles to effect feed cut-off during decompression.

Figure 4:
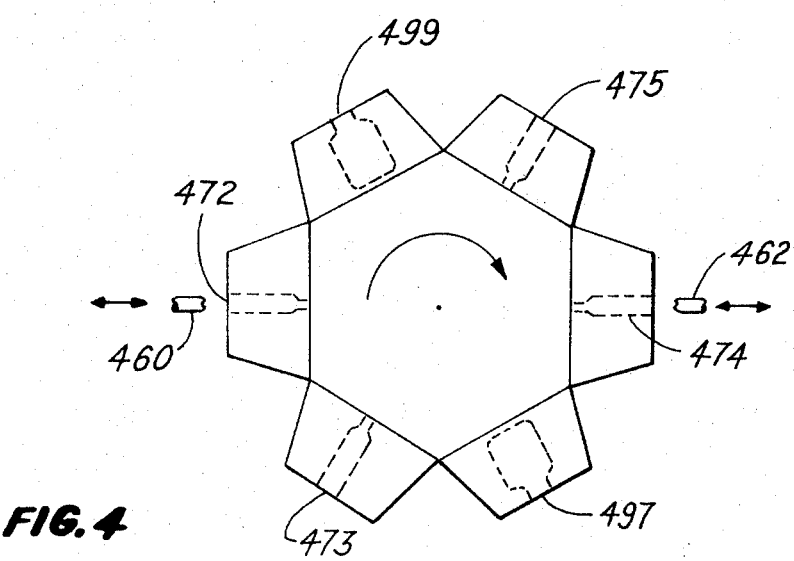
FIG. 4 is an end elevation diagram of a manifold.

FIG. 4 diagrams in end-elevation a further embodiment 416 of the manifold of this invention. This is a symmetrical hexagonal arrangement carrying four sets of injection molds 472, 473, 474, 475 in opposed-paired spacing-relation, and two injection blow molds 497, 499 at respective equal angles between the pairs of injection molds.

460 and 462 are the ends of cores.

Injection blow molding of parts which consist of two different materials or two different colored materials is made possible using this structure together with the FIG. 1 feed and clamp arrangements. Rotation is clockwise as indicated. In sequence, cores 460, 462 pick up parisons from injection mold cavities 472, 474, simultaneously, then reciprocate out, the manifold rotates 60°, the cores pick up a portion of different material (as, for example, of different color) from injection mold cavities 473, 475, then reciprocate out, the manifold again rotates 60°, the cores then enter blow mold cavities 497, 499, and the parisons are blown to shape. Following this, the finished products leave the blow mold cavities with the cores and are ejected from the cores while the manifold again rotates 60° to begin the cycle again. It will be seen that the mix can be made in the manifold or in the mold, as the preference may be for the application.

In like manner, two color injection molding is possible using a four-sided manifold. Similarly, other regular polygons can be used, but for pressure-balancing purposes, at least four sides are preferred.

It will be appreciated also that the FIG. 4 embodiment is not limited to the applications described, but can be flexibly adapted to various similar uses.

It can be seen that in all embodiments other substantial advantages of this invention appear:

each individual part requires only one core, one parison cavity, and one blow cavity;

the cores are ruggedly mounted yet completely accessible;

there is only one moving contact point at each injection point; and there are no multiple-nozzle seal problems.

Obviously, many modifications and variations of the present invention are possible in light of the above teachings. For example, any complete sub-group of the structures disclosed can be used, although without all advantages described. It is, therefore, to be understood that within the scope of the appended claims the invention may be practiced otherwise than as specifically described.

I claim:

1. A molding system comprising: manifold means, bearing means for rotatively supporting the manifold means, said manifold means having a distribution system therein including a sprue located along the rotative axis of the manifold means, said sprue being connective with cavity means in a surface of the manifold means radially disposed with respect to the rotative axis of the manifold means, means for introducing material into the axial sprue and means for reciprocating into and away from said cavity means at an angle to the axis of the manifold means for thereby receiving and removing material from said cavity means.

2. A molding system comprising: manifold means, bearing means for rotatively supporting the manifold means, said manifold means having a distribution system therein including an axial sprue connective with cavity means in an outer surface of the manifold means, said cavity means including plural, oppositely directed cavities; means for introducing material into the axial sprue comprising an injector at each end thereof, and means for reciprocating into and away from said cavity means at an angle to the axis of the manifold, including plural, oppositely directed cores, for thereby receiving and removing material from said cavity means.

3. A molding system as recited in claim 2, wherein a portion of at least one injector has an axially movable connection with the manifold means for thereby reducing pressure in the manifold means by said axial movement.

4. A molding system as recited in claim 3, wherein portions of both injectors are axially movable for reducing pressure in the manifold means.

5. A molding system as recited in claim 3, wherein said axially movable connection includes an axially overlapping rotative-translative connection.

6. A molding system as recited in claim 5, wherein the bearing means includes a journal at each end of the manifold means.

7. A molding system as recited in claim 2, wherein the distribution system includes a valve adapted, when closed, to restrict respective portions of said sprue and cavity means to introduction of material by the respective injectors.

8. A molding system as recited in claim 7, wherein additionally, plural, oppositely directed blow molds aligned for co-action with said cores are provided at a rotative angle about said axis with respect to said cavity means.

9. A molding system as recited in claim 8, wherein the cavity means includes additionally, a further plurality of oppositely directed cavities disposed at a rotative angle about said axis with respect to the first said cavities and blow molds.

10. A molding system as recited in claim 9, wherein the means for reciprocation includes clamp means, platen means, and tie bar means; with the platen means mounting said cores, with the tie bar means transverse to said manifold means axis of rotation, and with the clamp means adapted to reciprocate the platen means along the tie bar means with the oppositely directed cores diametrically aligned with respect to said manifold axis.

* * * * *